United States Patent [19]

Meyer et al.

[11] Patent Number: 4,507,762

[45] Date of Patent: Mar. 26, 1985

[54] METHOD AND APPARATUS FOR GENERATING MONOPULSE ULTRASONIC SIGNALS

[75] Inventors: Raymond A. Meyer; Frederick S. Howard, both of Thousand Oaks, Calif.; John E. Brugger, Hightstown, N.J.

[73] Assignee: The United States of America as represented by the Administrator Environmental Protection Agency, Washington, D.C.

[21] Appl. No.: 422,941

[22] Filed: Sep. 24, 1982

[51] Int. Cl.[3] .......................... G10K 11/00; G01S 7/52

[52] U.S. Cl. .......................... 367/137; 310/317

[58] Field of Search .................. 367/137, 138; 310/317

[56] References Cited

U.S. PATENT DOCUMENTS

| | | | |
|---|---|---|---|
| 2,651,012 | 9/1953 | Van Valkenburg et al. | 310/317 |
| 2,778,002 | 1/1957 | Howry | 367/137 |
| 3,715,710 | 2/1973 | Bernstein et al. | 367/137 |
| 4,282,452 | 8/1981 | Hassler et al. | 367/137 |

*Primary Examiner*—Richard A. Farley

[57] ABSTRACT

A method of transmitting half-sinewave ultrasonic monopulses utilizes a flip-flop (22) to reverse the states of a bridge circuit ($Q_1$-$Q_4$) with each output pulse from a timing pulse generator (20). This reverses the polarity of a dc voltage which stresses a piezoelectric transducer (24) to substantially its limit. Each pulse from the timing generator thus causes one mechanical transition of the transducer and clamps it in its reversed stress condition, thereby producing a half-sinewave ultrasonic output for each timing pulse.

5 Claims, 4 Drawing Figures

METHOD AND APPARATUS FOR GENERATING MONOPULSE ULTRASONIC SIGNALS

ORIGIN OF INVENTION

The invention described herein resulted from research and development under Contract No. 68-03-3014 between the U.S. Environmental Protection Agency and Rockwell International Corporation.

BACKGROUND OF THE INVENTION

This invention relates to a method and apparatus for generation of single-pulse ultrasonic signals at selectable pulse repetition rates.

Ultrasonic signals are typically generated by stressing a piezoelectric material with sinusoidal electrical signal. When the electrical signal is terminated, the transducer continues to ring in damped oscillation over several cycles. The length of the electrical signal plus the ringing period determines the duration of the output ultrasonic signal, commonly referred to as a pulse, although in fact consists of many cycles of a sinusoidal wave. The width of this pulse limits temporal resolution when used in nondestructive testing, complicates its use in depth-finding, and limits the minimum usable depth. Additionally, the major power limitation in depth-finding usage is cavitation at the transducer surface. It would be desirable to generate an output pulse of minimum width using a conventional piezoelectric ultrasonic transducer.

SUMMARY OF THE INVENTION

In accordance with this invention, a piezoelectric transducer is stressed to substantially its limit by application of a voltage of one polarity to transmit a monopulse of half sinewave, and subsequently by application of a voltage of opposite polarity to transmit another monopulse of half sinewave. The process may be repeated at a selected pulse repetition rate, holding the piezoelectric material stressed with one polarity after each pulse. To accomplish that, a bridge circuit of four switches is utilized to apply a high voltage to the transducer. The bridge is switched by a bistable circuit. Each time the bistable circuit is triggered by a pulse from a timing pulse generator, the bridge reverses the high voltage to the transducer.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
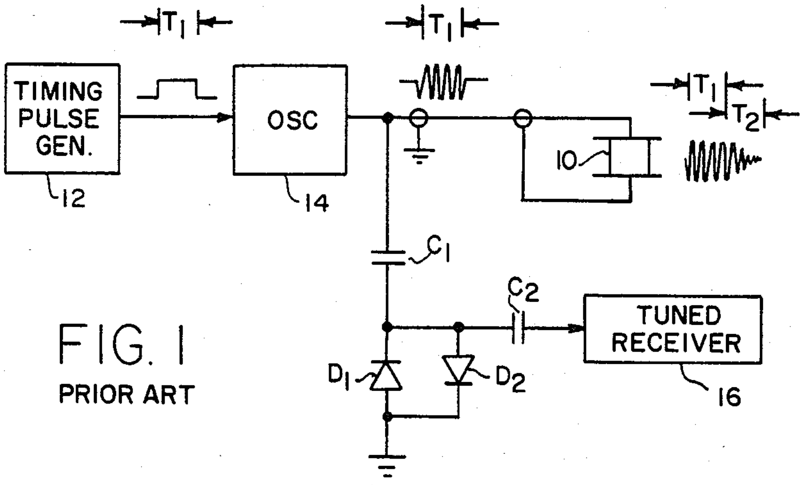
FIG. 1 PRIOR ART
FIG. 1 illustrates a conventional technique for pulsing an ultrasonic transducer.

Referring to FIG. 1, a prior-art technique for pulsing an ultrasonic transducer 10 made of a piezoelectric crystal or material consists of generating a pulse with a timing pulse generator 12 and gating an oscillator 14 on for the period $T_1$ of the pulse generated. Several cycles of a sinusoidal waveform from the oscillator are thus used to excite the transducer. As noted hereinbefore, when the signal from the oscillator is terminated, the transducer continues to ring for a period $T_2$ which may be equal to the pulse period $T_1$.

The same, or separate transducer, will pick up any echoes reflected by an interface of the medium through which the pulse is being transmitted with a medium of different speed of sound. These echo signals are ac coupled to a tuned receiver 16 by capcacitors $C_1$ and $C_2$. The receiver is protected against damage from transmitted pulses by limiting diodes $D_1$ and $D_2$.

The total period $(T_1+T_2)$ determines the duration of the transmitted pulses, and therefore also determines the duration of echo pulses. This total period limits temporal resolution of signals, and limits resolution between two echo pulses closely spaced in time.

Figure 2:
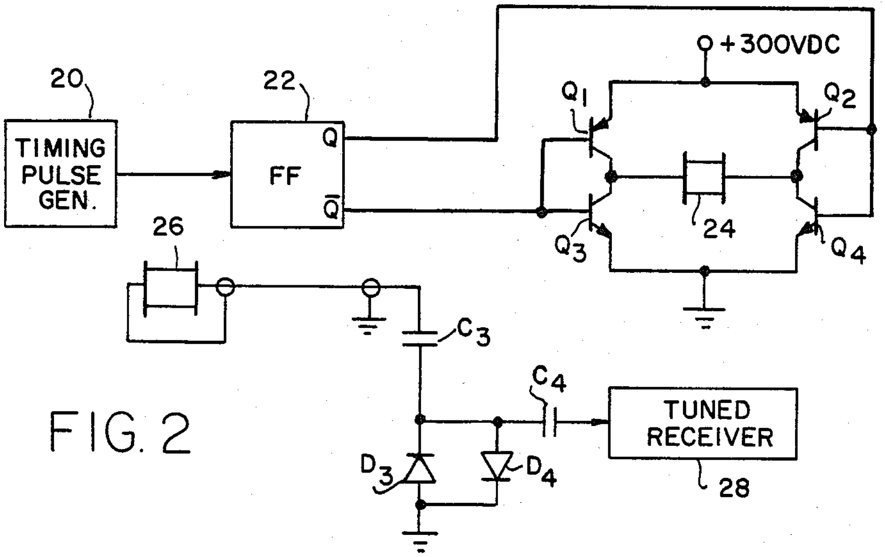
FIG. 2 illustrates an improved technique for pulsing an ultrasonic transducer in accordance with the present invention.
Figure 3:
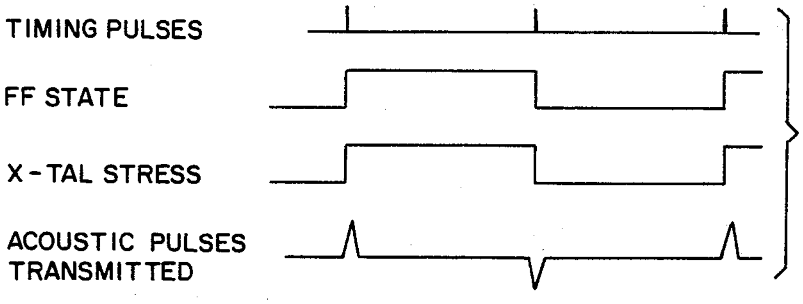
FIG. 3 is a timing diagram for the technique of FIG. 2.

The present invention illustrated in FIG. 2 utilizes a timing pulse generator 20 to produce a short pulse for each acoustic (ultrasonic) pulse to be transmitted, as shown in the timing diagram of FIG. 3. A flip-flop 22 changes state upon the application of each pulse from the generator. Each time the flip-flop changes state, it reverses the state of a transistor bridge comprised of transistors $Q_1$ through $Q_4$ arranged so that transistors $Q_1$ and $Q_4$ are turned on when the flip-flop is in the state with its output $\overline{Q}$ low and its output Q high, and transistors $Q_2$ and $Q_3$ are turned on when the flip-flop is in its alternate state. Connected horizontally across the bridge is an ultrasonic transducer 24, and connected across the bridge vertically is a dc voltage source (+300 v). The net result is to apply the voltage with reversing polarity to the ultrasonic crystal every time the flip-flop changes state. Each reversal of polarity causes one mechanical transition to produce one ultrasonic pulse of half a sinewave as shown in FIG. 3. The voltage applied to the transducer of one polarity or the other clamps the transducer in its reversed condition and eliminates ringing.

Because the transducer is clamped between ultrasonic pulse transmitted, it cannot be used to receive echo pulses. Instead a transducer 26 ac coupled to a tuned receiver 28 by capacitors $C_3$ and $C_4$ is used with limiting diodes $D_3$ and $D_4$ as in the prior art.

From the foregoing it is evident that this invention causes the transducer 24 to make a single transition between its positively stressed position to its negatively stressed position or vice versa with each timing pulse generated, resulting in a half sinewave output at the resonant frequency of the transducer. There is no ringing because, at the termination of the electrical cycle, the transducer is clamped in a stressed position. This causes the generation of a single pulse of ultrasonic energy as shown in FIG. 3. Cavitation is no longer a factor since there is no reciprocal fluid movement. Therefore, power transmission to the liquid is only limited by the power capabilities of the crystal.

Figure 4:
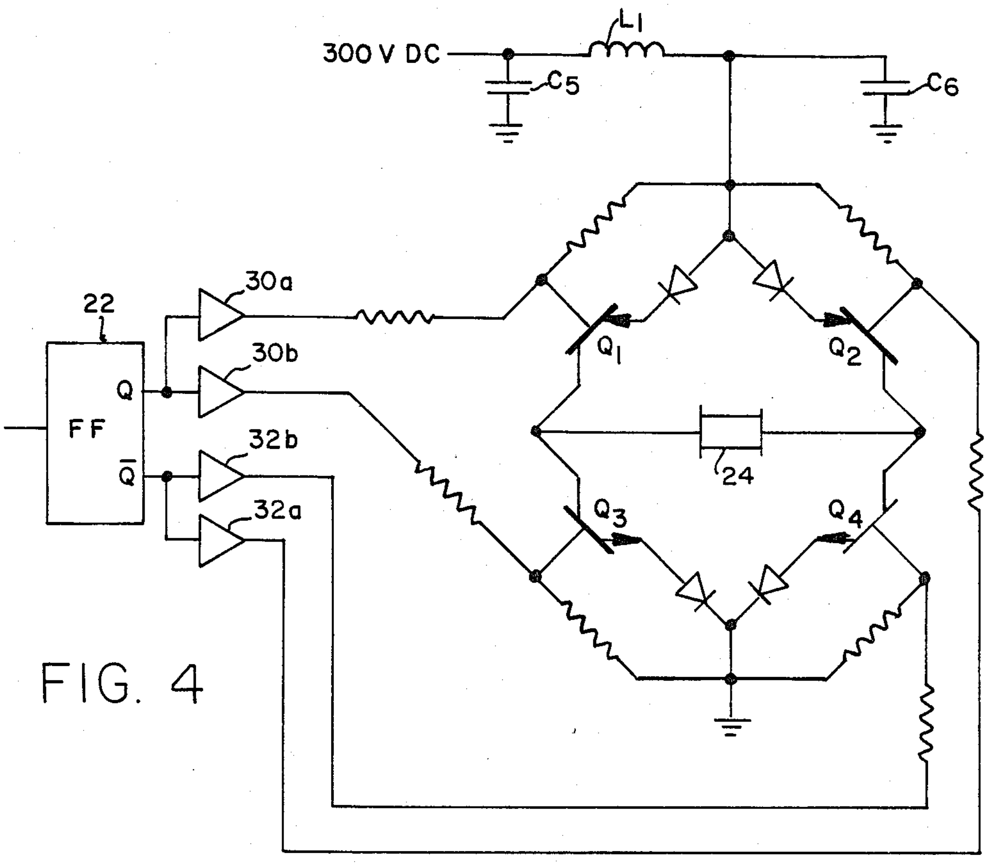
FIG. 4 illustrates an exemplary implementation of the invention.

Referring now to FIG. 4, in which the same reference numerals are used for the same elements as in FIG. 2, the transistor bridge comprised of transistors $Q_1$–$Q_4$ is shown connected to a +300 v dc by a filter consisting of an inductor $L_1$ and two capacitors, $C_5$ and $C_6$. Each transistor has a diode connected in series with its base-emitter junction to hold the emitter voltage of the transistor above its base by the amount of the diode voltage drop while conducting. The flip-flop 22 drives the transistors $Q_1$ and $Q_3$ through inverting amplifiers 30*a* and 30*b* on the true (Q) side of the flip-flop, and transistors $Q_2$ and $Q_4$ through inverting amplfiers 32*a* and 32*b* on the $\overline{Q}$ side of the flip-flop. A resistor is connected between the base and emitter of each transistor for bias, and the base of each transistor is connected to its driving amplifier by a current limiting resistor. The two resistors connected to the base of each transistor also serve as a voltage dividing network to reduce the output voltage of the driving amplifier to a level that will not damage the transistor.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method for generating monopulse ultrasonic signals from a piezoelectric transducer comprising the steps of applying a dc voltage to stress said transducer to substantially its limit and holding that voltage until the next monopulse to be generated, and for each monopulse ultrasonic signal to be generated reversing the polarity of said dc voltage applied to said transducer from one polarity to the other, and holding that reverse polarity voltage until the next monopulse to be generated, whereby a monopulse of half sinewave is transmitted each time the polarity of said voltage is reversed to switch the stress in said transducer from one polarity to an opposite polarity.

2. Apparatus for generating monopulse ultrasonic signals from a piezoelectric transducer comprising a source of constant dc voltage of sufficient amplitude to stress said piezoelectric transducer to its limit, bistable means, switching means responsive to said bistable means for selectively applying said constant voltage to said transducer with either polarity, and means for alternately switching said bistable means from one state to the other for each monopulse ultrasonic signal to be transmitted.

3. Apparatus as defined in claim 2 wherein said switching means is comprised of a bridge circuit of four switches, and means for connecting said switches to said bistable means to turn diagonally opposite switches on, and hold off adjacent switches during one interval from one monopulse ultrasonic signal to the next, and to switch the states of four switches during the next interval.

4. Apparatus as defined in claim 3 wherein said bistable means is comprised of a triggered flip-flop.

5. Apparatus as defined in claim 4 including means for generating electric pulses at a pulse repetition rate desired for said monopulse ultrasonic signals, said pulse generating means being connected to the trigger input of said flip-flop, whereby each electric pulse generated reverses the polarity of the stress of said piezoelectric transducer to produce an ultrasonic pulse of half sinewave at a rate equal to said pulse repetition rate.

* * * * *